US010728313B2

(12) United States Patent
Jain et al.

(10) Patent No.: US 10,728,313 B2
(45) Date of Patent: Jul. 28, 2020

(54) FUTURE CONNECTION SCORE OF A NEW CONNECTION

(71) Applicant: Microsoft Technology Licensing, LLC, Redmond, WA (US)

(72) Inventors: Aastha Jain, Sunnyvale, CA (US); Shilpa Gupta, Mountain View, CA (US); Myunghwan Kim, San Jose, CA (US); Shaunak Chatterjee, Sunnyvale, CA (US); Hema Raghavan, Mountain View, CA (US); Souvik Ghosh, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 373 days.

(21) Appl. No.: 15/488,159

(22) Filed: Apr. 14, 2017

(65) Prior Publication Data

US 2018/0260482 A1 Sep. 13, 2018

Related U.S. Application Data

(60) Provisional application No. 62/469,132, filed on Mar. 9, 2017.

(51) Int. Cl.
*H04L 29/08* (2006.01)
*G06Q 50/00* (2012.01)
*G06Q 10/10* (2012.01)

(52) U.S. Cl.
CPC ............. *H04L 67/10* (2013.01); *G06Q 10/10* (2013.01); *G06Q 50/01* (2013.01); *H04L 67/306* (2013.01)

(58) Field of Classification Search
CPC ........... G06F 16/9535; G06F 16/24578; G06F 16/90324; G06F 16/951; G06F 2221/2111; G06F 16/285; G06F 16/3322; G06F 16/9024; G06F 2221/2145; G06F 3/04847
USPC ........... 707/600–831, 839, 999.001–999.206
See application file for complete search history.

(56) References Cited

U.S. PATENT DOCUMENTS

| 2008/0146334 A1* | 6/2008 | Kil ......................... G16H 50/30 463/36 |
| 2011/0213741 A1* | 9/2011 | Shama ................... G06N 20/00 706/13 |
| 2015/0074215 A1* | 3/2015 | Arquette ................. H04L 51/32 709/206 |

(Continued)

*Primary Examiner* — Angelica Ruiz
(74) *Attorney, Agent, or Firm* — Schwegman Lundberg & Woessner, P.A.

(57) ABSTRACT

A system, a machine-readable storage medium storing instructions, and a computer-implemented method are described herein are directed to Future Connection Engine that generates a select pairing of member accounts for a potential social network connection. The Future Connection Engine predicts, according to the prediction model, a first number of subsequent social network connections for a first member account in the select pairing that will occur after establishing the potential social network connection and a second number of subsequent social network connections for a second member account in the select pairing that will occur after establishing the potential social network connection. The Future Connection Engine generates connection recommendations for display to the select pairing based on whether the first and/or the second number of subsequent social network connections satisfies a threshold.

20 Claims, 6 Drawing Sheets

(56) References Cited

U.S. PATENT DOCUMENTS

| | | | |
|---|---|---|---|
| 2015/0170175 A1* | 6/2015 | Zhang | G06Q 30/0204 |
| | | | 705/7.33 |
| 2015/0220999 A1* | 8/2015 | Thornton | G06Q 30/0201 |
| | | | 705/14.66 |
| 2015/0248651 A1* | 9/2015 | Akutagawa | G06Q 10/1095 |
| | | | 705/7.19 |
| 2016/0253325 A1* | 9/2016 | Morley | G06F 16/9535 |
| | | | 707/749 |
| 2016/0253710 A1* | 9/2016 | Publicover | H04W 4/21 |
| | | | 705/14.66 |
| 2017/0017886 A1* | 1/2017 | Gao | G06N 5/04 |
| 2017/0091692 A1* | 3/2017 | Guo | G06F 16/58 |
| 2017/0213127 A1* | 7/2017 | Duncan | G16B 50/00 |

\* cited by examiner

FUTURE CONNECTION SCORE OF A NEW CONNECTION

CROSS-REFERENCE TO RELATED APPLICATIONS

This application claims the benefit of priority to U.S. Provisional Patent Application entitled "Future Connection Score of a New Connection," Ser. No. 62/469,132, filed Mar. 9, 2017, which is hereby incorporated herein by reference in its entirety.

TECHNICAL FIELD

The subject matter disclosed herein generally relates to the technical field of special-purpose machines that facilitate prediction of how many new social network connections that will be formed with a member account after the member account and another member account establish a social network connection, including software-configured computerized variants of such special-purpose machines and improvements to such variants, and to the technologies by which such special-purpose machines become improved compared to other special-purpose machines that facilitate such prediction of new social network connections.

BACKGROUND

A social networking service is a computer- or web-based application that enables users to establish links or connections with persons for the purpose of sharing information with one another. Some social networking services aim to enable friends and family to communicate with one another, while others are specifically directed to business users with a goal of enabling the sharing of business information. For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks").

With many social networking services, members are prompted to provide a variety of personal information, which may be displayed in a member's personal web page. Such information is commonly referred to as personal profile information, or simply "profile information", and when shown collectively, it is commonly referred to as a member's profile. For example, with some of the many social networking services in use today, the personal information that is commonly requested and displayed includes a member's age, gender, interests, contact information, home town, address, the name of the member's spouse and/or family members, and so forth. With certain social networking services, such as some business networking services, a member's personal information may include information commonly included in a professional resume or curriculum vitae, such as information about a person's education, employment history, skills, professional organizations, and so on. With some social networking services, a member's profile may be viewable to the public by default, or alternatively, the member may specify that only some portion of the profile is to be public by default. Accordingly, many social networking services serve as a sort of directory of people to be searched and browsed.

DESCRIPTION OF THE DRAWINGS

Some embodiments are illustrated by way of example and not limitation in the figures of the accompanying drawings in which.

DETAILED DESCRIPTION

Figure 1:
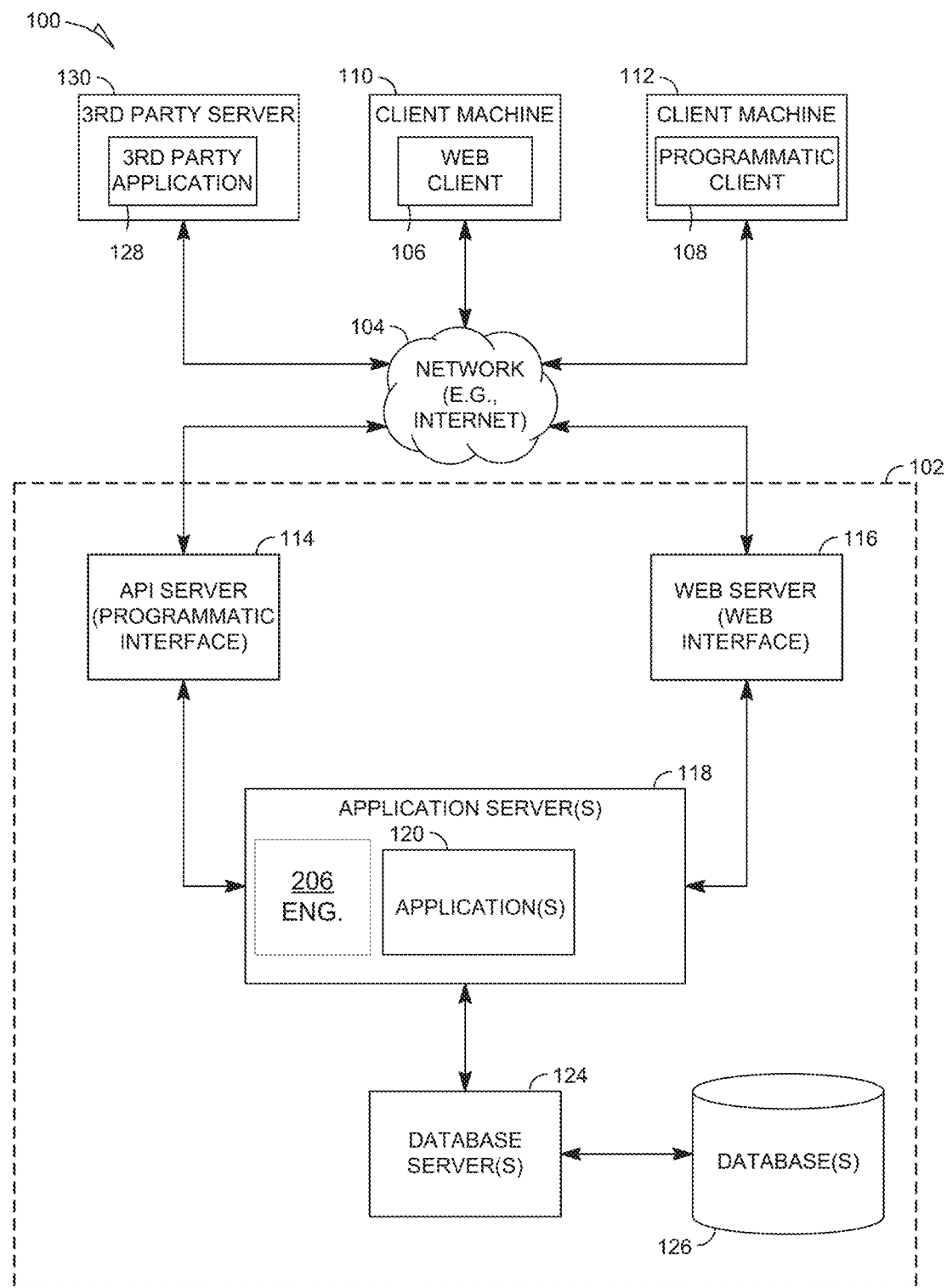
FIG. 1 is a block diagram illustrating a client-server system, in accordance with an example embodiment.

The present disclosure describes methods and systems for predicting how many future social network connections in a professional social networking service (also referred to herein as a "professional social network" or "social network") will be formed as a result of establishing a social network connection between a pair of member accounts. In the following description, for purposes of explanation, numerous specific details are set forth in order to provide a thorough understanding of the various aspects of different embodiments described in the present disclosure. It will be evident, however, to one skilled in the art, that various aspects described herein may be practiced without all of the specific details.

A system, a machine-readable storage medium storing instructions, and a computer-implemented method are described herein are directed to a Future Connection Engine. The Future Connection Engine identifies a first member account and a second member account that may form a social network connection. The Future Connection Engine inputs social network data of the first and second member accounts into a prediction model in order to determine how many new social network connections will be formed by each of the first and second member accounts after the first and second members establish a social network connection with each other.

According to one or more embodiments, the Future Connection Engine generates a select pairing of member accounts for a potential social network connection in a social network service. The Future Connection Engine predicts, according to the prediction model, a first number of subsequent social network connections for a first member account in the select pairing that will occur after establishing the potential social network connection and a second number of subsequent social network connections for a second member account in the select pairing that will occur after establishing the potential social network connection. Upon determining the first number of subsequent social network connections satisfies a threshold, causing display in the social network service of a first recommendation to establish the potential social network connection to the first member account; and upon determining the second number of subsequent social network connections satisfies the threshold, causing display in the social network service of a second recommendation to establish the potential social network connection to the second member account. By sending recommendations to each member account in the select pairing, the first and second member accounts may elect to form a social network connection. Since the prediction model has determined that the select pairing will result in future connections, the recommendations assist the member accounts in the select pairing in identifying member accounts that will trigger growth in their respective network of social connections, thereby ensuring that the member accounts will remain active and engaged in the social network service.

In an example embodiment, the prediction model is a logistic regression model. The Future Connection Engine assembles feature vector data based on a plurality of types of features of the logistic regression model. Certain types of features are based on an attribute(s) or a characteristic(s) of a member account, an attribute(s) or a characteristic(s) of a member account's current social network, or a comparison between attributes and characteristics of a pairing of member accounts. The Future Connection Engine selects two member accounts for a select pairing that may establish a potential social network connection. The Future Connection Engine inputs into the logistic regression model such attributes and characteristics of one or two member accounts correspond with the various types of features. The Future Connection Engine assemble feature vector data base don the various types of features. The Future Connection Engine executes one or more calculations according to the logistic regression model based on the feature vector data to generate prediction output for each member account in the select pairing. Prediction output indicates how many new social network connections will be formed by a member account if the select pairing of member accounts actually establishes a social network connection.

It is understood that various embodiments further include encoded instructions that comprise operations to generate a user interface(s) and various user interface elements. The user interface and the various user interface elements can be displayed to be representative of any of the operations, prediction models, logistic regression model, features, training data, feature vector data and weighted vector data, as described herein. In addition, the user interface and various user interface elements are generated by the Future Connection Engine for display on a computing device, a server computing device, a mobile computing device, etc.

As described in various embodiments, the Future Connection Engine may be a configuration-driven system for building, training, and deploying prediction models for making predictions. In particular, the operation of the Future Connection Engine is completely configurable and customizable by a user through a user-supplied configuration file such as a JavaScript Object Notation (JSON), eXtensible Markup Language (XML) file, etc. For example, each module in the Future Connection Engine may have text associated with it in the configuration file that describes how the module is configured, the inputs to the module, the operations to be performed by the module on the inputs, the outputs from the module, and so on. Accordingly, the user may rearrange the way these modules are connected together as well as the rules that the various modules use to perform various operations. Thus, whereas conventional prediction modeling is often performed in a fairly ad hoc and code driven manner, the modules of the Future Connection Engine may be configured in a modular and reusable fashion, to enable more efficient prediction modeling.

Turning now to FIG. 1, FIG. 1 is a block diagram illustrating a client-server system, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102. In some embodiments, the networked system 102 may comprise functional components of a professional social network.

Figure 2:
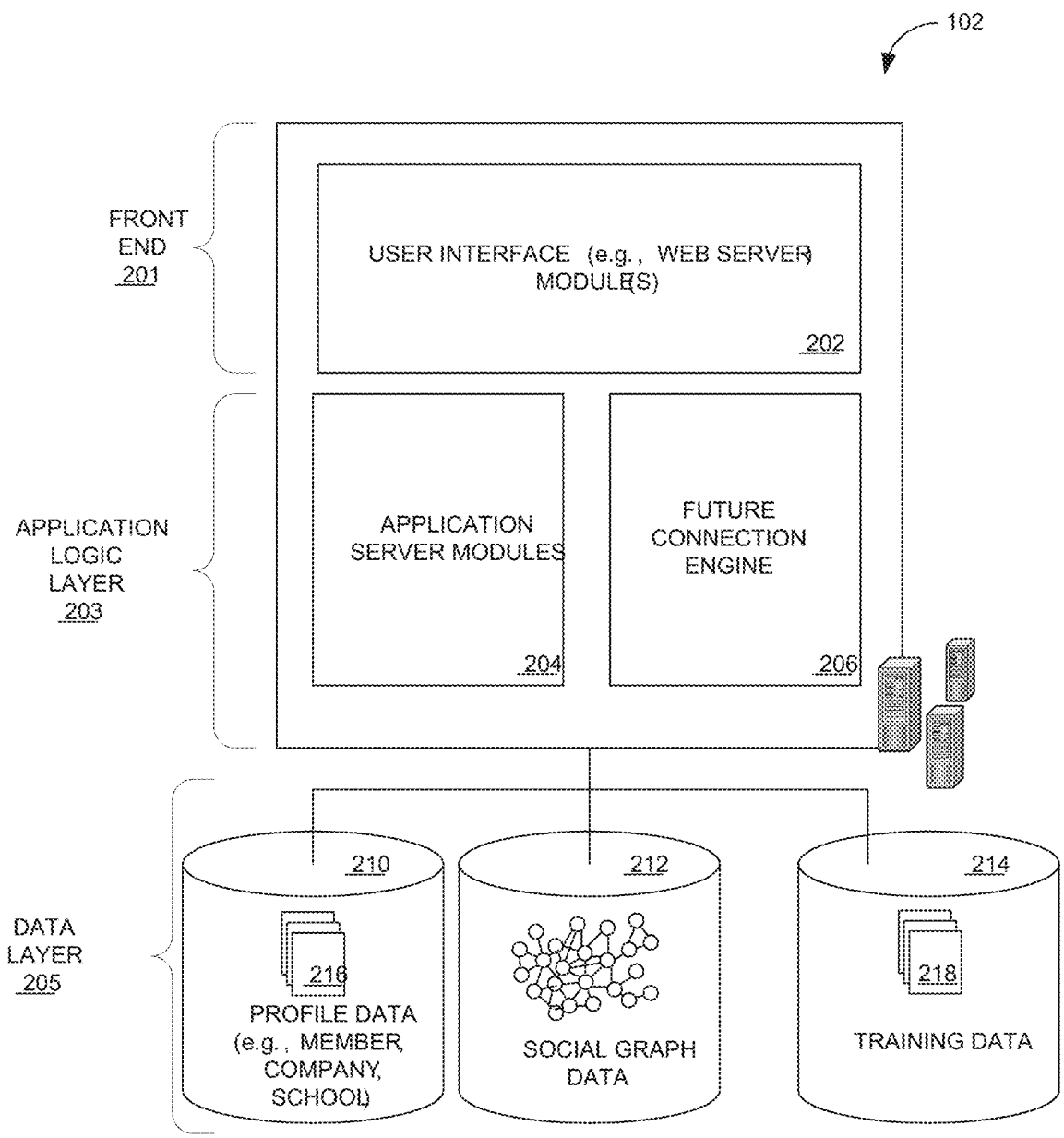
FIG. 2 is a block diagram showing functional components of a professional social network within a networked system, in accordance with an example embodiment.

FIG. 2 is a block diagram showing functional components of a professional social network within the networked system 102, in accordance with an example embodiment.

As shown in FIG. 2, the professional social network may be based on a three-tiered architecture, consisting of a front-end layer 201, an application logic layer 203, and a data layer 205. In some embodiments, the modules, systems, and/or engines shown in FIG. 2 represent a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 2. However, one skilled in the art will readily recognize that various additional functional modules and engines may be used with a professional social network, such as that illustrated in FIG. 2, to facilitate additional functionality that is not specifically described herein. Furthermore, the various functional modules and engines depicted in FIG. 2 may reside on a single server computer, or may be distributed across several server computers in various arrangements. Moreover, although a professional social network is depicted in FIG. 2 as a three-tiered architecture, the inventive subject matter is by no means limited to such architecture. It is contemplated that other types of architecture are within the scope of the present disclosure.

As shown in FIG. 2, in some embodiments, the front-end layer 201 comprises a user interface module (e.g., a web server) 202, which receives requests and inputs from various client-computing devices, and communicates appropriate responses to the requesting client devices. For example, the user interface module(s) 202 may receive requests in the form of Hypertext Transport Protocol (HTTP) requests, or other web-based, application programming interface (API) requests.

In some embodiments, the application logic layer 203 includes various application server modules 204, which, in conjunction with the user interface module(s) 202, generates various user interfaces (e.g., web pages) with data retrieved from various data sources in the data layer 205. In some embodiments, individual application server modules 204 are used to implement the functionality associated with various services and features of the professional social network. For instance, the ability of an organization to establish a presence in a social graph of the social network service, including the ability to establish a customized web page on behalf of an organization, and to publish messages or status updates on behalf of an organization, may be services implemented in independent application server modules 204. Similarly, a variety of other applications or services that are made available to members of the social network service may be embodied in their own application server modules 204.

As shown in FIG. 2, the data layer 205 may include several databases, such as a database 210 for storing profile data 216, including both member profile attribute data as well as profile attribute data for various organizations. Consistent with some embodiments, when a person initially registers to become a member of the professional social network, the person will be prompted to provide some profile attribute data such as, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information may be stored, for example, in the database 210. Similarly, when a representative of an organization initially registers the organization with the professional social network the representative may be prompted to provide certain information about the organization. This information may be stored, for example, in the database 210, or another database (not shown). With some embodiments, the profile data 216 may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or a seniority level within a particular company. With some embodiments, importing or otherwise accessing data from one or more externally hosted data sources may enhance profile data 216 for both members and organizations. For instance, with companies in particular, financial data may be imported from one or more external data sources, and made part of a company's profile. It is understood that the profile data 216 can be part of social network data.

The profile data 216 may also include information regarding settings for members of the professional social network. These settings may comprise various categories, including, but not limited to, privacy and communications. Each category may have its own set of settings that a member may control.

Once registered, a member may invite other members, or be invited by other members, to connect via the professional social network. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, may be stored and maintained as social graph data within a social graph database 212.

The professional social network may provide a broad range of other applications and services that allow members the opportunity to share and receive information, often customized to the interests of the member. For example, with some embodiments, the professional social network may include a photo sharing application that allows members to upload and share photos with other members. With some embodiments, members may be able to self-organize into groups, or interest groups, organized around a subject matter or topic of interest. With some embodiments, the professional social network may host various job listings providing details of job openings with various organizations.

In some embodiments, the professional social network provides an application programming interface (API) module via which third-party applications can access various services and data provided by the professional social network. For example, using an API, a third-party application may provide a user interface and logic that enables an authorized representative of an organization to publish messages from a third-party application to a content hosting platform of the professional social network that facilitates presentation of activity or content streams maintained and presented by the professional social network. Such third-party applications may be browser-based applications, or may be operating system-specific. In particular, some third-party applications may reside and execute on one or more mobile devices (e.g., a smartphone, or tablet computing devices) having a mobile operating system.

The data in the data layer 205 may be accessed, used, and adjusted by the Future Connection Engine 206 as will be described in more detail below in conjunction with FIGS. 3-6. Although the Future Connection Engine 206 is referred to herein as being used in the context of a professional social network, it is contemplated that it may also be employed in the context of any website or online services, including, but not limited to, content sharing sites (e.g., photo- or video-sharing sites) and any other online services that allow users to have a profile and present themselves or content to other users. Additionally, although features of the present disclosure are referred to herein as being used or presented in the context of a web page, it is contemplated that any user interface view (e.g., a user interface on a mobile device or on desktop software) is within the scope of the present disclosure.

As members create descriptions of skills, with the various applications, services and content made available via the professional social network (also referred herein as a "social network" or "social network service"), training data 218 is collected, updated and may be stored, for example, as indicated in FIG. 2, by the database 214.

Figure 3:
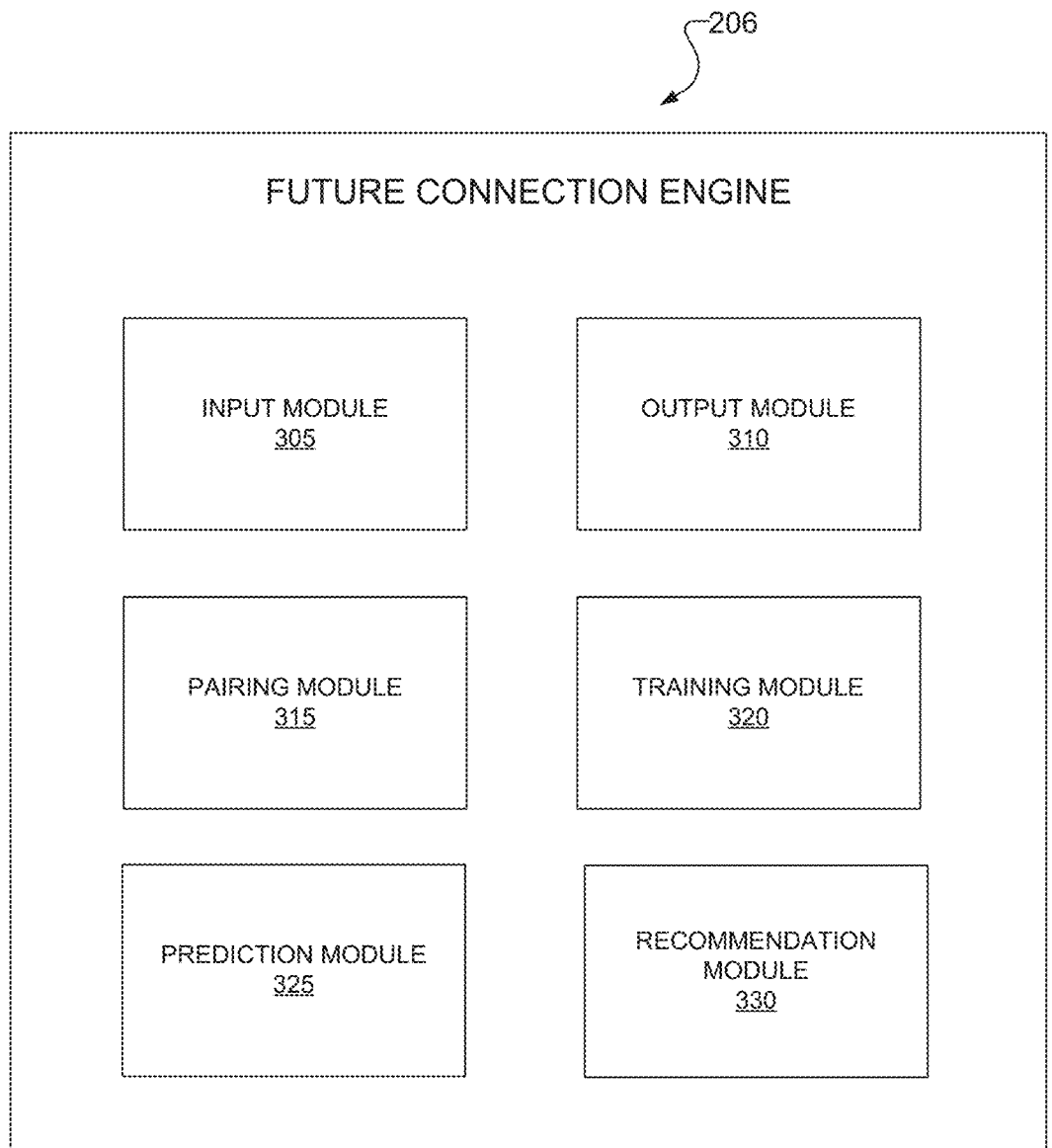
FIG. 3 is a block diagram showing example components of a Future Connection Engine, according to an example embodiment.

FIG. 3 is a block diagram showing example components of a Future Connection Engine 206, according to an example embodiment;

The input module 305 is a hardware-implemented module that controls, manages and stores information related to any inputs from one or more components of system 102 as illustrated in FIG. 1 and FIG. 2. In various embodiments, the inputs include a selection of a profile update functionality by a target member account. In various embodiments, an input also includes a selection of a profile attribute for a profile of any member account in the social network.

The output module 310 is a hardware-implemented module that controls, manages and stores information related to which sends any outputs to one or more components of system 100 of FIG. 1 (e.g., one or more client devices 110, 112, third party server 130, etc.). In some embodiments, the output is a prompt sent for a display on a client device that corresponds with a target member account.

The pairing module 315 is a hardware implemented module which manages, controls, stores, and accesses information related to identifying a pairing a member accounts that currently do not have social network connection.

The training module 320 is a hardware-implemented module which manages, controls, stores, and accesses information related to build, train and update one or more rules of a prediction model. In addition, the training module 320

The prediction module 325 is a hardware-implemented module which manages, controls, stores, and accesses information related to generating prediction output indicating a predicted number of new social network connections for a member account in a given pairing that will be formed within a period of time after establishing a social network connection with another member account in the given pairing.

The recommendation module 330 is a hardware-implemented module which manages, controls, stores, and accesses information related to generating a recommendation to form a social network connection for display to each member account in a given pairing.

Figure 4:
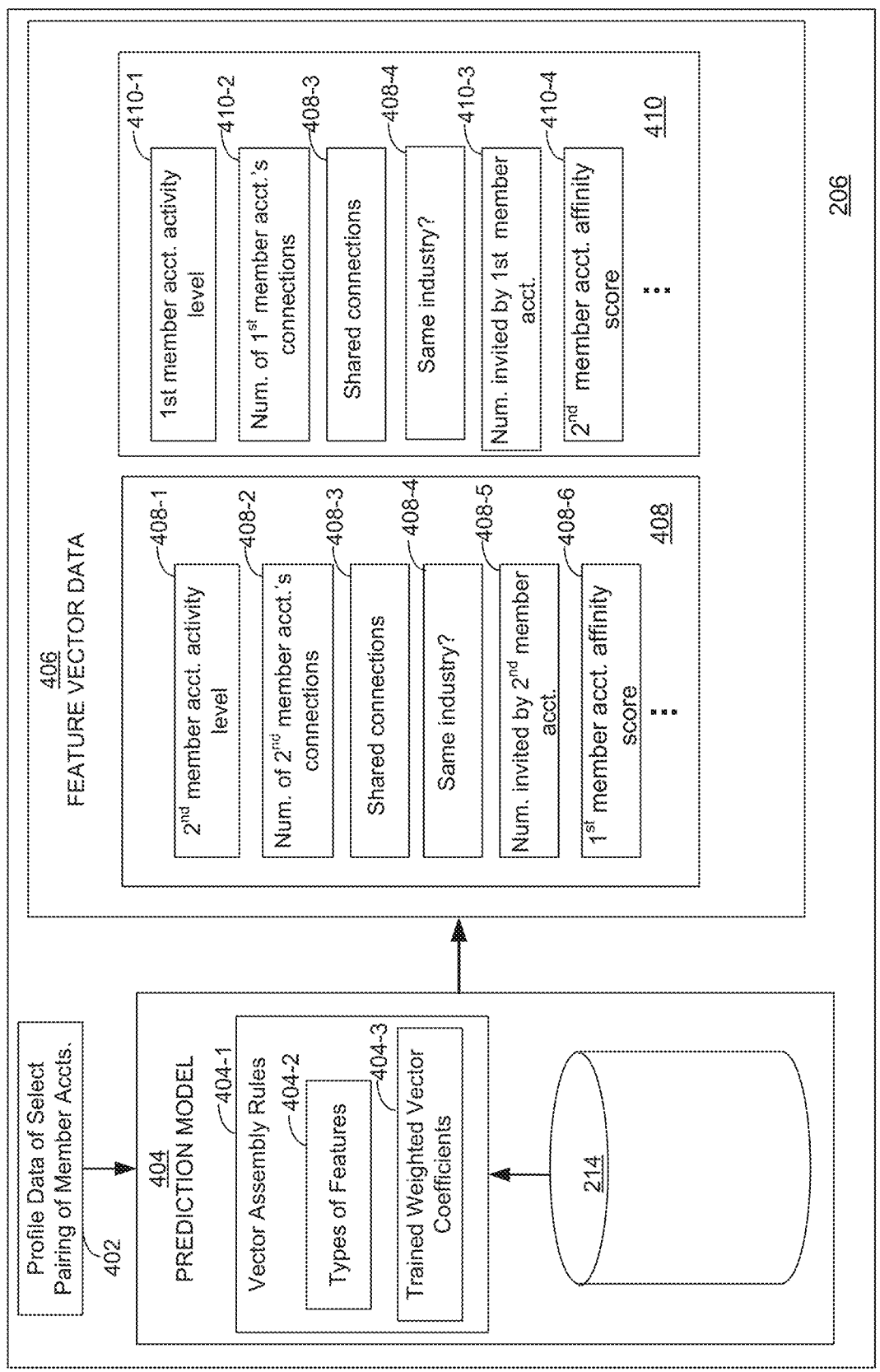
FIG. 4 illustrates a schematic diagram of data flow in a Future Connection Engine, according to an example embodiment.

FIG. 4 illustrates a schematic diagram of data flow in a Future Connection Engine 206, according to an example embodiment.

The Future Connection Engine 206 builds and trains a prediction model 404. For example, in an example embodiment, the prediction model 404 is a logistic regression model. The Future Connection Engine 206 generates a select pairing of member accounts for a potential social network connection in a social network service. For example, the Future Connection Engine 206 identifies a first member account and a second member account that have yet to form a social network connection. The first and second member account in the select pairing each have profile data 402. For example, profile data 402 is social network data about member account profile attributes, current social network connections, profile attributes of current social network connections and social network behaviour, such as page views, likes, shares, content posts, messages sent and received, and purchases.

The Future Connection Engine 206 inputs the profile data 402 into the prediction model 404 in order to assemble, according to one or more encoded rules 404-1 of the prediction model 404, feature vector data 406. The vector assembly rules 404-1 include a plurality of pre-defined types of features 404-2 identified by the Future Connection Engine 206 during the training process. It is understood that a pre-defined feature is a respective type of social network data that has been identified as relevant in calculating a prediction by the prediction model 404. In addition, during the training process, the Future Connection Engine 206 calculates weighted vector coefficients 404-3. For example, each pre-defined type of feature is assigned a regression coefficient by the Future Connection Engine 206.

The Future Connection Engine 206 generates first feature vector data 408 for the first member account and second feature vector data 410 for the second member account. As shown in FIG. 4, the first and second feature vector data 408, 410 are based on various pre-defined types of features, such as: member account activity level feature, a current number of social network connections feature, a shared connections feature, a same industry match feature, a number of social connection invitations sent by a member account feature and a member account affinity score feature.

The Future Connection Engine 206 assembles first feature vector data 408 for the first member account in the select pairing. The features in the first feature vector data 408 are based on the second member account's level of social network activity 408-1, a current number of the second member account's social network connections 408-2, a current number of shared connections between the first and second member account 408-3, whether the first and second member account shared the same industry descriptor 408-4, a number of social network connection invitations sent by the second member account during a particular time range 408-5 and an affinity score of the first member account 408-6.

The features in the second feature vector data are based on the first member account's level of social network activity 410-1, a current number of the first member account's social network connections 410-2, the current number of shared connections between the first and second member account 408-3, whether the first and second member account shared the same industry descriptor 408-4, a number of social network connection invitations sent by the first member account during the particular time range 410-3 and an affinity score of the second member account 410-4.

The Future Connection Engine 206 generates, based on the feature vector data 406, the encoded rules of the prediction model 404-2 and the trained weighted vector coefficients 404-3, first prediction output and second prediction output. For example, the first prediction output indicates a predicted number of new social network connections for the first member account that will be formed within a period of time after establishing a social network connection with the second member account. In order to calculate the first prediction output, the Future Connection Engine 206 calculates a weighted sum of the first feature vector data 408. The second prediction output indicates a predicted number of new social network connections for the second member account that will be formed within the period of time after establishing the social network connection with the first member account. In order to calculate the second prediction output, the Future Connection Engine 206 calculates a weighted sum of the second feature vector data 410.

Figure 5:
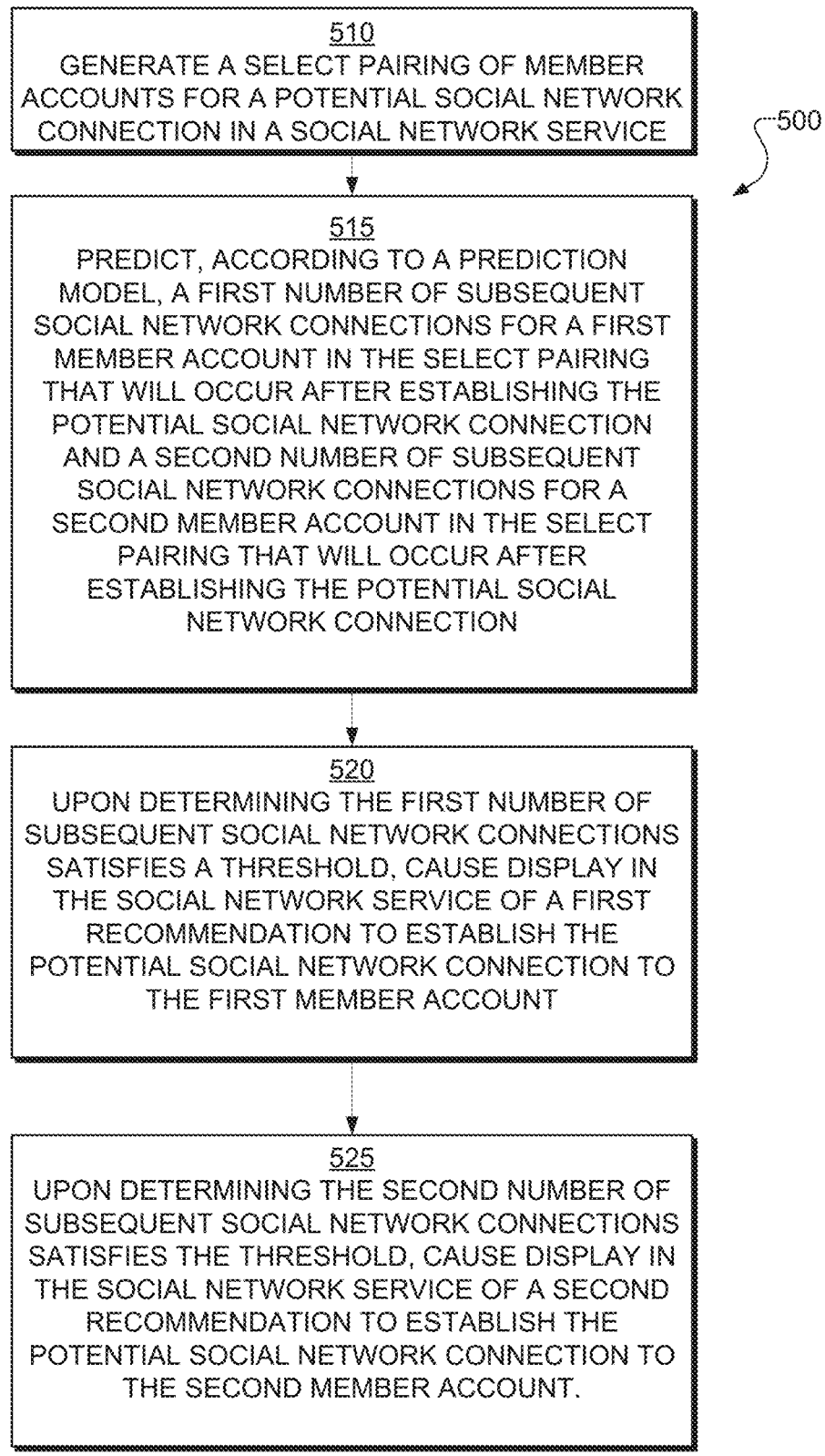
FIG. 5 is a flowchart illustrating an example method for determining subsequent social network connections that will be formed after a select pairing forms a social network connection, according to an example embodiment.

FIG. 5 is a flowchart 500 illustrating an example method for determining subsequent social network connections that will be formed after a select pairing forms a social network connection, according to an example embodiment.

At operation 510, the Future Connection Engine 206 generates a select pairing of member accounts for a potential social network connection in a social network service. The select pairing is a pair of member accounts that have yet to establish a social network connection.

At operation 515, the Future Connection Engine 206 predicts, according to a prediction model, a first number of subsequent social network connections for a first member account in the select pairing that will occur after establishing the potential social network connection. In addition, the Future Connection Engine 206 predicts, according to the prediction model, a second number of subsequent social network connections for a second member account in the select pairing that will occur after establishing the potential social network connection. It is understood that the first and second number of subsequent social network connections are determined with respect to a particular time range after the potential social network connection is actually established. For example, the first and second number of subsequent social network connections are based on one week after the potential social network connection is actually established, or 3 days after the potential social network connection is actually established.

In various embodiments, the Future Connection Engine 206 may use any one of various known prediction modeling techniques to build, train and update the prediction model 404 via the prediction module 325. For example, according to various exemplary embodiments, the prediction module 325 may perform the prediction modeling process based on a statistics-based machine learning model—such as a logistic regression model.

As understood by those skilled in the art, logistic regression is an example of a statistics-based machine learning technique that uses a logistic function. The logistic function is based on a variable, referred to as a log it. The log it is defined in terms of a set of regression coefficients of corresponding independent predictor variables. Logistic regression can be used to predict the probability of occurrence of an event given a set of independent/predictor variables. A highly simplified example machine learning model using logistic regression may be $\ln[p/(1-p)]=a+BX+e$, or $[p/(1-p)]=\exp(a+BX+e)$, where ln is the natural logarithm, $\log_{exp}$, where $\exp=2.71828\ldots$, p is the probability that the event Y occurs, $p(Y=1)$, $p/(1-p)$ is the "odds ratio", $\ln[p/(1-p)]$ is the log odds ratio, or "log it", a is the coefficient on the constant term, B is the regression coefficient(s) on the independent/predictor variable(s), X is the independent/predictor variable(s), and e is the error term.

The independent/predictor variables of the logistic regression model are the attributes represented by the assembled feature vectors described throughout. The regression coefficients may be estimated using maximum likelihood or learned through a supervised learning technique from data collected in logs or calculated from log data, as described in more detail below. Accordingly, once the appropriate regression coefficients (e.g., B) are determined, the features included in the assembled feature vector may be plugged in to the logistic regression model in order to predict the probability that the event Y occurs (where the event Y may be, for example, whether the particular member clicks on the particular content item in the particular context). In other words, provided an assembled feature vector including various features associated with a particular member, a particular content item, a particular context, and so on, the assembled feature vector may be applied to a logistic regression model to determine the probability that the particular member will respond to the particular content item in a particular way (e.g., click) given the particular context. Logistic regression is well understood by those skilled in the art, and will not be described in further detail herein, in order to avoid occluding various aspects of this disclosure.

The prediction module 325 may use various other prediction modeling techniques understood by those skilled in the art to predict whether a particular member will click on a particular content item in a particular context. For example, other prediction modeling techniques may include other machine learning models such as a Naïve Bayes model, a support vector machines (SVM) model, a decision trees model, and a neural network model, all of which are understood by those skilled in the art.

According to various exemplary embodiments, the prediction module 325 may be used for the purposes of both off-line training (for generating, training, refining and updating the prediction model 404) and online inferences (for predicting a number of subsequent social network connections for both member account in a select pairing after the select pairing forms a social network connection).

For example, if the prediction module 325 is utilizing a logistic regression model (as described above), then the regression coefficients (such as the weighted vector coefficients 404-3) of the logistic regression model may be learned through a supervised learning technique from data collected in logs or calculated from log data. Accordingly, in one embodiment, the prediction module 325 of the Future Connection Engine 206 may operate in an off-line training mode by assembling log data into assembled feature vectors. For example, whenever a member of a social network service performs a particular user action (such as forming a particular social network connection with a select member account, forming additional social network connections after forming the particular social network connection), various information describing aspects of this interaction (e.g., information social network data, information describing the member accounts, information describing the social network connections, information describing the particular context, etc.) may be stored as entries in an interaction log. Over time, the log data may include millions or even billions of entries, representing interactions between different member accounts and different social network connections in different contexts.

Accordingly, the prediction module 325 may access, for example, all the log entries in the past 30 days where various members performed various user actions (e.g., a click or a non-click on content items, social network connection formation), and the prediction module 325 may convert each of these log entries into an assembled feature vector, based on the various embodiments described herein. For the purposes of training the prediction model 404, the prediction module 325 generally needs both examples of where users performed an action (e.g., click), as well as examples of where users did not perform the action (e.g., non-click). The assembled feature vectors may then be passed to the prediction module, in order to refine regression coefficients for the logistic regression model. For example, statistical learning based on the Alternating Direction Method of Multipliers technique may be utilized for this task.

Thereafter, once the regression coefficients are determined, the prediction module 325 may operate to perform online inferences based on the prediction model 404 (including the trained coefficients) on a single assembled feature vector. For example, according to various exemplary embodiments described herein, the prediction module 325 is configured to predict the likelihood that a particular member will perform a particular user action.

At operation 520, the Future Connection Engine 206, upon determining the first number of subsequent social network connections satisfies a threshold, causing display in the social network service of a first recommendation to establish the potential social network connection to the first member account. For example, the threshold can be a pre-defined number that must be satisfied or exceeded. The threshold can be learned and updated by the prediction model 404.

At operation 525, the Future Connection Engine 206, upon determining the second number of subsequent social network connections satisfies the threshold, causing display in the social network service of a second recommendation to establish the potential social network connection to the second member account. For example, a recommendation to form the potential social network connection is displayed as a selectable content item in a social network content feed.

According to exemplary embodiments, a member account activity level feature type is based on social network data of a member account representing the member account's social network behaviour during a time range. Social network data includes, for example, page views, likes, shares, content posts, messages sent and received, and purchases. A current number of social network connections feature type represents a current number of social network connections of a member account. A shared connections feature type represents a current number of common social network connections shared between two member accounts. A same industry match feature type represents whether two member accounts have the same industry descriptor tag in their respective profile data. A number of social connection invitations sent by a member account feature type represents how many invitations to form a social network connection have been sent from a member account to other member accounts.

In addition, a member account affinity score feature type represents how likely a member account is to send a social network connection invitation to another member account having a certain type of social network data. For example, in a select pairing that includes a first and second member account, feature vector data for the first member account includes an affinity score feature type. An affinity score is based on how many social network connections of the second member account have a type of social network data that are present in the social network data of other member accounts to whom the first member account previously sent an invitation to connect.

For example, the first member account has previously sent a first threshold number of social network connection invitations to various member accounts having one or more of a type of education attribute, a job title attribute, a company attribute and/or a geography attribute. For example, an education attribute can be a name of a university ("Stanford"). The second member account has a second threshold number of social network connections with member accounts that have "Stanford" in their profile data portion of their social network data. Based on the first and second thresholds being met, a portion of feature vector for the first member account is generated indicating the second member account has a current social network to which the first member account will likely send social network connection invitations.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 6:
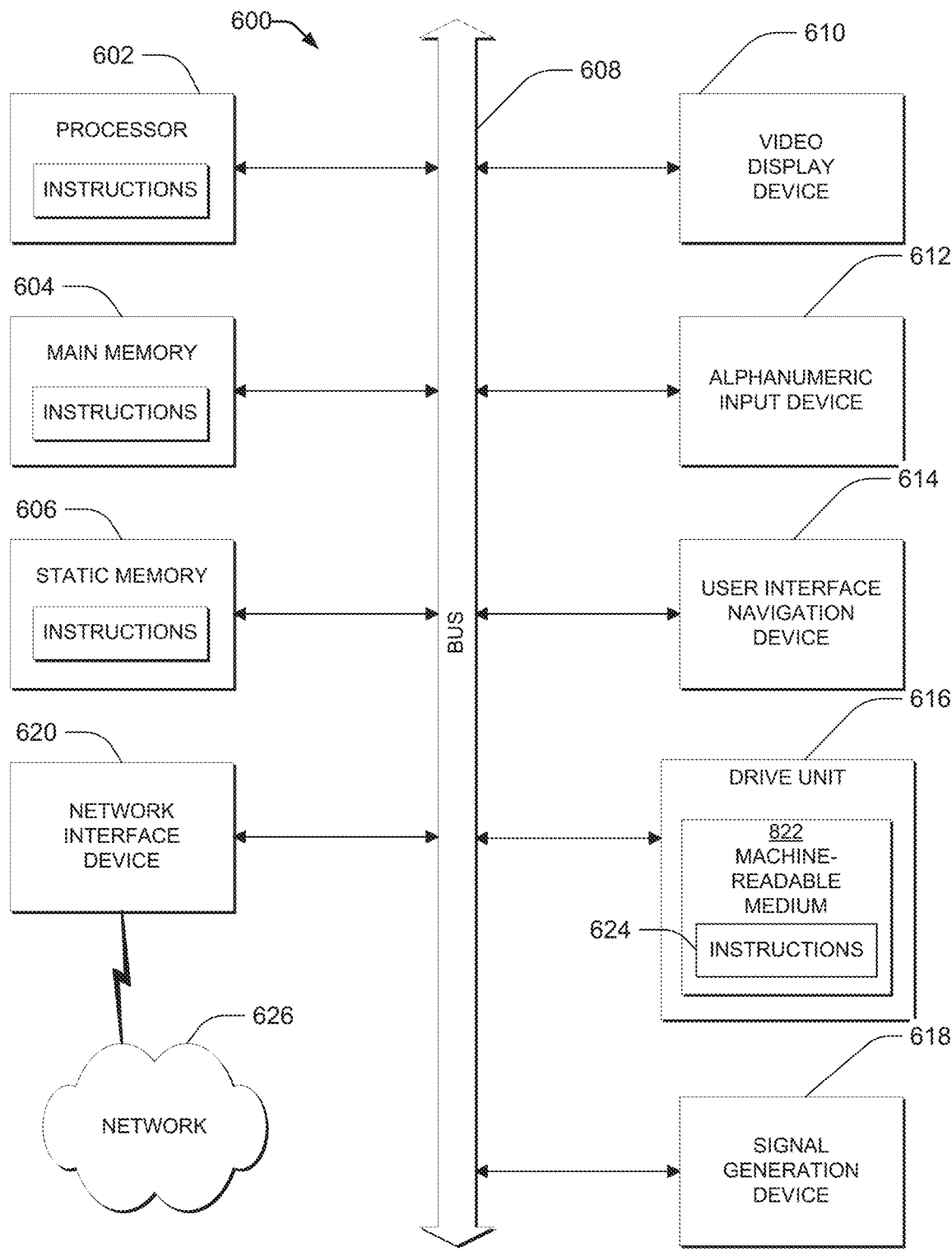
FIG. 6 is a block diagram of an example computer system on which methodologies described herein may be executed, in accordance with an example embodiment.

FIG. 6 is a block diagram of a machine in the example form of a computer system 600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 600 includes a processor 602 (e.g., a central processing unit (CPU), a graphics processing unit (GPU) or both), a main memory 604, and a static memory 606, which communicate with each other via a bus 608. Computer system 600 may further include a video display device 610 (e.g., a liquid crystal display (LCD) or a cathode ray tube (CRT)). Computer system 600 also includes an alphanumeric input device 612 (e.g., a keyboard), a user interface (UI) navigation device 614 (e.g., a mouse or touch sensitive display), a disk drive unit 616, a signal generation device 618 (e.g., a speaker) and a network interface device 620.

Disk drive unit 616 includes a machine-readable medium 622 on which is stored one or more sets of instructions and data structures (e.g., software) 624 embodying or utilized by any one or more of the methodologies or functions described herein. Instructions 624 may also reside, completely or at least partially, within main memory 604, within static memory 606, and/or within processor 602 during execution thereof by computer system 600, main memory 604 and processor 602 also constituting machine-readable media.

While machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present technology, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 624 may further be transmitted or received over a communications network 626 using a transmission medium. Instructions 624 may be transmitted using network interface device 620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the technology. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer system, comprising:
one or more processors;
one or more memories holding an instruction set executable on the one or more processors to cause the computer system to perform operations comprising:
generating a select pairing of member accounts for a potential social network connection in a social network service;
assembling feature vector data based at least on profile data associated with at least one member account in the select pairing;
generating a prediction model based on the feature vector data and one or more encoded rules, the feature vector data being identified as relevant in calculating future connections of at the at least one member in the account pairing;
predicting, according to the prediction model, a first number of subsequent social network connections for a first member account in the select pairing that will occur after establishing the potential social network connection and a second number of subsequent social network connections for a second member account in the select pairing that will occur after establishing the potential social network connection;
upon determining the first number of subsequent social network connections satisfies a threshold, causing display in the social network service of a first recommendation to establish the potential social network connection to the first member account; and
upon determining the second number of subsequent social network connections satisfies the threshold, causing display in the social network service of a second recommendation to establish the potential social network connection to the second member account.

2. The computer system of claim 1, wherein predicting, according to a prediction model, the first number of subsequent social network connections and the second number of subsequent social network connections comprises:
generating, based on the feature vector data and the encoded rules of the prediction model, first prediction output and second prediction output, the first prediction output indicating a predicted number of new social network connections for a first member account in the given pairing that will be formed within a period of time after establishing a social network connection between the given pairing, the second prediction output indicating a predicted number of new social network connections for a second member account that will be formed within the period of time after establishing the social network connection between the given pairing.

3. The computer system of claim 2, wherein at least one of encoded rules of the prediction model represent at least one calculation of a logistic regression model.

4. The computer system of claim 3, wherein at least one encoded rule of the prediction model comprises at least one type of pre-defined feature associated with a learned regression coefficient for a corresponding type of pre-defined feature.

5. The computer system of claim 2, wherein a first type of feature comprises a total of common social network connections shared between member accounts in the given pairing.

6. The computer system of claim 5, wherein a second type of feature comprises a measure of social network activity level of one of the member accounts in the given pairing.

7. The computer system of claim 6, wherein a third type of feature comprises a total number of social network connection invitations sent from one of the member accounts in the given pairing during a particular time range.

8. The computer system of claim 7, wherein a fourth type of feature comprises an indication of whether the member accounts in the given pairing belong to a same type of industry descriptor.

9. The computer system of claim 8, wherein a fifth type of feature is an affinity score for one of the member accounts in the given pairing.

10. A non-transitory computer-readable medium storing executable instructions thereon, which, when executed by a processor, cause the processor to perform operations including:

generating a select pairing of member accounts for a potential social network connection in a social network service;

assembling feature vector data based at least on profile data associated with at least one member account in the select pairing;

generating a prediction model based on the feature vector data and one or more encoded rules, the feature vector data being identified as relevant in calculating future connections of at the at least one member in the account pairing;

predicting, according to the prediction model, a first number of subsequent social network connections for a first member account in the select pairing that will occur after establishing the potential social network connection and a second number of subsequent social network connections for a second member account in the select pairing that will occur after establishing the potential social network connection;

upon determining the first number of subsequent social network connections satisfies a threshold, causing display in the social network service of a first recommendation to establish the potential social network connection to the first member account; and upon determining the second number of subsequent social network connections satisfies the threshold, causing display in the social network service of a second recommendation to establish the potential social network connection to the second member account.

11. The non-transitory computer-readable medium of claim 10, wherein predicting, according to a prediction model, the first number of subsequent social network connections and the second number of subsequent social network comprises:

generating, based on the feature vector data and the encoded rules of the prediction model, first prediction output and second prediction output, the first prediction output indicating a predicted number of new social network connections for a first member account in the given pairing that will be formed within a period of time after establishing a social network connection between the given pairing, the second prediction output indicating a predicted number of new social network connections for a second member account that will be formed within the period of time after establishing the social network connection between the given pairing.

12. The non-transitory computer-readable medium of claim 11, wherein at least one of encoded rules of the prediction model represent at least one calculation of a logistic regression model.

13. The non-transitory computer-readable medium of claim 12, wherein at least one encoded rule of the prediction model comprises at least one type of pre-defined feature associated with a learned regression coefficient for a corresponding type of pre-defined feature.

14. The non-transitory computer-readable medium of claim 12, wherein a first type of feature comprises a total of common social network connections shared between member accounts in the given pairing.

15. The non-transitory computer-readable medium of claim 14, wherein a second type of feature comprises a measure of social network activity level of one of the member accounts in the given pairing.

16. The non-transitory computer-readable medium of claim 15, wherein a third type of feature comprises a total number of social network connection invitations sent from one of the member accounts in the given pairing during a particular time range.

17. The non-transitory computer-readable medium of claim 16, wherein a fourth type of feature comprises an indication of whether the member accounts in the given pairing belong to a same type of industry descriptor.

18. The non-transitory computer-readable medium of claim 17, wherein a fifth type of feature is an affinity score for one of the member accounts in the given pairing.

19. A computer-implemented method, comprising:

generating, via at least one hardware processor, a select pairing of member accounts for a potential social network connection in a social network service;

assembling feature vector data based at least on profile data associated with at least one member account in the select pairing;

generating a prediction model based on the feature vector data and one or more encoded rules, the feature vector data being identified as relevant in calculating future connections of at the at least one member in the account pairing;

predicting, according to a prediction model, a first number of subsequent social network connections for a first member account in the select pairing that will occur after establishing the potential social network connection and a second number of subsequent social network connections for a second member account in the select pairing that will occur after establishing the potential social network connection;

upon determining the first number of subsequent social network connections satisfies a threshold, causing display in the social network service of a first recommendation to establish the potential social network connection to the first member account; and upon determining the second number of subsequent social network connections satisfies the threshold, causing display in the social network service of a second recommendation to establish the potential social network connection to the second member account.

20. The computer-implemented method of claim 19, wherein predicting, according to a prediction model, the first number of subsequent social network connections and the second number of subsequent social network comprises:

generating, based on the feature vector data and the encoded rules of the prediction model, first prediction output and second prediction output, the first prediction output indicating a predicted number of new social network connections for a first member account in the given pairing that will be formed within a period of time after establishing a social network connection between the given pairing, the second prediction output indicating a predicted number of new social network connections for a second member account that will be formed within the period of time after establishing the social network connection between the given pairing.

* * * * *